United States Patent
Dyba

(10) Patent No.: US 9,488,824 B2
(45) Date of Patent: Nov. 8, 2016

(54) MICROSCOPIC DEVICE AND MICROSCOPIC METHOD FOR THE THREE-DIMENSIONAL LOCALIZATION OF POINT-LIKE OBJECTS

(75) Inventor: Marcus Dyba, Heidelberg (DE)

(73) Assignee: LEICA MICROSYSTEMS CMS GMBH, Wetzlar (DE)

(*) Notice: Subject to any disclaimer, the term of this patent is extended or adjusted under 35 U.S.C. 154(b) by 909 days.

(21) Appl. No.: 13/600,463

(22) Filed: Aug. 31, 2012

(65) Prior Publication Data
US 2013/0229494 A1    Sep. 5, 2013

(30) Foreign Application Priority Data
Sep. 2, 2011  (DE) ........................ 10 2011 053 232

(51) Int. Cl.
G02B 21/36 (2006.01)
G02B 21/18 (2006.01)

(52) U.S. Cl.
CPC ............. G02B 21/367 (2013.01); G02B 21/18 (2013.01)

(58) Field of Classification Search
CPC .. G02B 21/367; G02B 21/18; G02B 21/244; G02B 21/241; G02B 21/0032; G02B 21/365; G02B 21/24; G02B 7/32; G02B 7/28; G02B 7/38; G02B 21/006; G02B 21/22; G02B 27/2271; G02B 21/20; G02B 21/0012; G02B 21/242; G02B 21/245; G06T 7/0022; G06T 15/06; H04N 13/0239; H04N 13/0055; H04N 13/0242; H04N 2013/0081; H04N 13/021; H04N 13/0217; H04N 5/23212; H04N 13/025; H04N 13/0271; G01N 21/6458; G01N 21/6456; G03B 13/36
USPC ....... 250/201.3, 208.1, 214 R; 359/376, 383; 348/42–44, 46, 47, 79, 80, 345, 348
See application file for complete search history.

(56) References Cited

U.S. PATENT DOCUMENTS 7,772,569 B2    8/2010    Bewersdorf et al.
8,084,754 B2    12/2011    Hell et al.
(Continued)

FOREIGN PATENT DOCUMENTS

DE    102006021317 B3    10/2007
DE    102008024568 A1    12/2009
(Continued)

OTHER PUBLICATIONS

"Three dimensional tracking of fluorescent nanoparticles with subnanometer precision by use of off-focus imaging," Optics Letters, 2003, vol. 28 (No. 2), Michael Speidel et al., p. 69-71.
(Continued)

Primary Examiner — Que T Le
(74) Attorney, Agent, or Firm — Leydig, Voit & Mayer, Ltd.

(57) ABSTRACT

A microscopic device provides three-dimensional localization of point-like objects and includes two imaging optics, each configured to image a same point-like object located in an object space into two separate image spaces as a focused light distribution. Two detector units are respectively associated with the imaging optics and configured to capture an analyzable light spot in detection points of a detection surface disposed in the respective image space. Each imaging optics includes an optical device that orients the focused light distributions obliquely to a detection axis such that, taking into account the detection point correspondence, the two light spots shift in opposite directions based on a z-position of the point-like object. An evaluation unit brings the detection points of the two detection surfaces into mutual pairwise correspondence and analyzes the two light spots so as to ascertain a lateral x-y position and an axial z-position of the point-like object.

17 Claims, 5 Drawing Sheets

(56) References Cited

U.S. PATENT DOCUMENTS

2009/0134342 A1    5/2009    Hell et al.
2013/0136311 A1    5/2013    Nishizaka et al.

FOREIGN PATENT DOCUMENTS

| DE | 102009060793 A1 | 7/2011 |
|---|---|---|
| JP | 2007017561 A | 1/2007 |
| WO | WO 2006127692 A1 | 11/2006 |
| WO | WO 2007128434 A1 | 11/2007 |
| WO | WO 2008091296 A1 | 7/2008 |
| WO | WO 2009085218 A1 | 7/2009 |

OTHER PUBLICATIONS

"Three-dimensional Particle Tracking via Bifocal Imaging," Nano Letters, 2007, vol. 7 (No. 7), pp. 2043-2045, Erdal Toprak, et al.
"Sub-diffraction-limit imaging by stochastic optical reconstruction microscopy (STORM)," Nature Methods 3, 793-795 (2006), M. J. Rust, M. Bates, X. Zhuang.
"Resolution of Lambda/10 in fluorescence microscopy using fast single molecule photo-switching," Geisler C. et al, Appl. Phys. A, 88, 223-226 (2007).

US 9,488,824 B2

MICROSCOPIC DEVICE AND MICROSCOPIC METHOD FOR THE THREE-DIMENSIONAL LOCALIZATION OF POINT-LIKE OBJECTS

CROSS REFERENCE TO RELATED APPLICATIONS

This application claims priority to German Patent Application No. DE 10 2011 053 232.3, filed Sep. 2, 2011, which is hereby incorporated by reference herein in its entirety.

FIELD

The present invention relates to a microscopic device for the three-dimensional localization of point-like objects. The present invention also relates to a microscopic method for the three-dimensional localization of point-like objects.

BACKGROUND

Light-microscopic imaging methods have been recently developed that have made it possible to image sample structures smaller than the diffraction-induced resolution limit of conventional light microscopes by employing a sequential, stochastic localization of individual markers, in particular fluorescence molecules. Such methods are described, for example, in WO 2006/127692 A2, DE 10 2006 021 317 B3, WO 2007/128434 A1, U.S. 2009/0134342 A1, DE 10 2008 024 568 A1, WO 2008/091296 A2, "Sub-diffraction-limit imaging by stochastic optical reconstruction microscopy (STORM)," Nature Methods 3, 793-796 (2006), M. J. Rust, M. Bates, X. Zhuang; "Resolution of Lambda/10 in fluorescence microscopy using fast single molecule photo-switching," Geisler C. et al, Appl. Phys. A, 88, 223-226 (2007). This new branch of microscopy is also referred to as localization microscopy. The applied methods are known in the literature, for example, by the designations (F)PALM ((fluorescence) photoactivation localization microscopy), PALMIRA (PALM with independently running acquisition), GSD(IM) (ground state depletion individual molecule return) microscopy) or (F)STORM ((fluorescence) stochastic optical reconstruction microscopy).

The new methods have in common that the preparation of sample structures to be imaged involves using point-like objects, generally referred to as markers, that have two distinguishable states, namely a "bright" state and a "dark" state. For example, if fluorescent dyes are used as markers, then the bright state is a state capable of fluorescence, and the dark state is a state that is incapable of fluorescence.

In specific embodiments, for example, in WO 2008/091296 A2 and WO 2006/127692 A2, photoswitchable or photoactivatable fluorescence molecules are used. Alternatively, as, for example, in the German Examined Accepted Specification DE 10 2006 021 317 B3, inherent dark states of standard fluorescence molecules are utilized.

To image sample structures at a resolution higher than the conventional resolution limit of the imaging optics, a small subset of the markers is repeatedly transferred to the bright state. This requires selecting a density of the markers forming this active subset that will ensure that the average distance between adjacent markers in the bright state and, thus, in the state that can be imaged by light microscopy, is greater than the resolution limit of the imaging optics. The markers forming the active subset are imaged onto a spatially resolving light detector, for example, a CCD camera, so that a light distribution in the form of a light spot, whose size is determined by the resolution limit of the optics, is recorded from each point-like marker.

A multitude of individual raw data images are thereby captured in each of which another active subset is imaged. In each individual raw data image, the centroid positions of the light distributions, that represent the point-like markers in the bright state, are then determined in an image analysis process. The centroid positions of the light distributions ascertained from the individual raw data images are then brought together in an overall representation in the form of an assembled image data record. The highly resolved assembled image resulting from this overall representation reflects the distribution of the markers.

Representatively reproducing the sample structure to be imaged requires that a sufficient number of marker signals be detected. However, since the number of markers in the particular active subset is limited by the required minimal average mutual distance between two markers in the bright state, a very large number of individual raw data images must be recorded to be able to completely image the sample structure. The number of individual raw data images typically ranges from 10,000 to 100,000.

In the above described localization microscopy methods, the centroid positions of the individual light spots produced on the light detector are typically only determined in two dimensions, so that the highly resolved image of the sample structure reconstructed from all of the centroid positions is likewise merely a two-dimensional image. It would be preferable, however, to reconstruct the sample structure in three dimensions.

Some related art methods make possible a three-dimensional positional determination of individual point-like objects in a sample. In this regard, reference is made exemplarily to WO 2009/085218 A1 and U.S. Pat. No. 7,772,569 B2, as well as to "Three-dimensional tracking of fluorescent nanoparticles with subnanometer precision by use of off-focus imaging," Optics Letters, 2003, vol. 28 (no. 2), Michael Speidel et al; and "Three-dimensional Particle Tracking via Bifocal Imaging," Nano Letters, 2007, vol. 7 (no. 7), pages 2043-2045, Erdal Toprak, et al. The method described in U.S. Pat. No. 7,772,569 B2 is based on the analysis of defocused image patterns on at least two image sensors in different image planes. In the method according to WO 2009/085218 A1, ellipticities of light patterns are analyzed using special optics.

The related art methods require a complicated image analysis for centroid determination and pattern recognition, or special optics that limit the general usefulness of microscopic devices functioning in accordance with these methods.

SUMMARY

In an embodiment, the present invention provides a microscopic device that provides three-dimensional localization of point-like objects. The device includes two imaging optics, each configured to image a same point-like object located in an object space into two separate image spaces in a form of a focused light distribution. Two detector units are respectively associated with a respective one of the imaging optics and configured to capture an analyzable light spot in detection points of a detection surface disposed in the respective image space that represents a planar cross section through the respective focused light distribution. Each of the imaging optics includes an optical device configured to orient the respective focused light distribution obliquely to a detection axis that is provided in the respective imaging optics and that is disposed perpendicularly to the detection surface of the respective detector unit. The obliquities of the two focused light distributions are mutually opposite in such a way that, taking into account the detection point correspondence, the two light spots shift in opposite directions in response to a change in the z-position of the point-like object in the respective detection surface. An evaluation unit is configured to bring the detection points of the two detection surfaces into mutual pairwise correspondence and to analyze the two light spots in view of the image point correspondences so as to ascertain a lateral x-y position of the point-like object within an object plane residing in the object space and an axial z-position of the point-like object in a direction of an optical axis disposed perpendicularly to the object plane. The evaluation unit ascertains the axial z-position of the point-like object based on the relative position of the two light spots.

BRIEF DESCRIPTION OF THE DRAWINGS

Exemplary embodiments of the present invention are explained in more detail below with reference to the drawings, in which.

DETAILED DESCRIPTION

Figure 1:
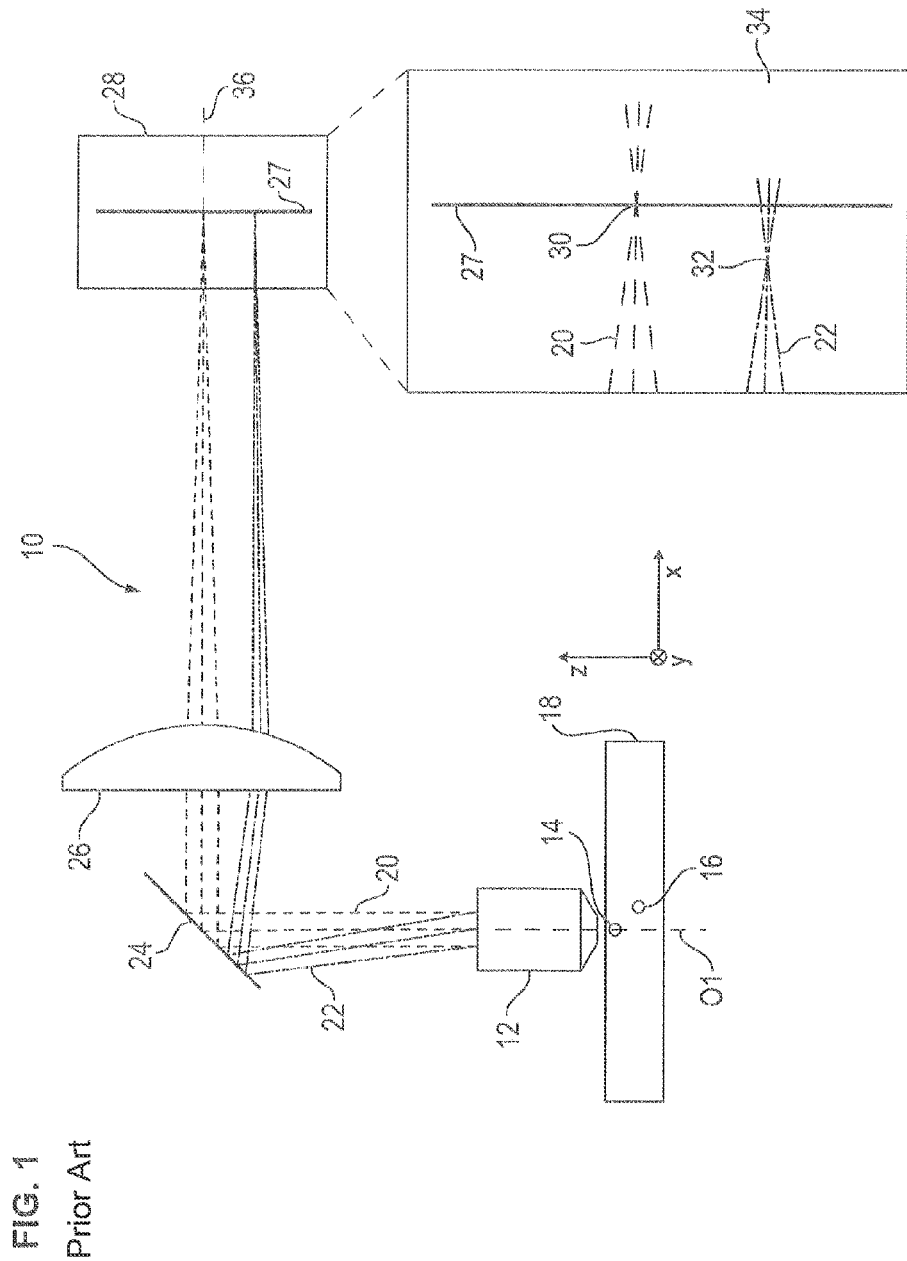
FIG. 1 shows a schematic representation of a light microscope for illustrating a conventional imaging of point-like objects onto a detector unit.

In an embodiment, the present invention provides a device and a method that will make possible a simple three-dimensional localization of point-like objects while entailing minimal technical outlay.

In an embodiment, the present invention provides a microscopic device for the three-dimensional localization of point-like objects, having two imaging optics, which image one and the same point-like object located in an object space into two separate image spaces, in each case in the form of a focused light distribution, two detector units, which are each assigned to one of the two imaging optics and capture an analyzable light spot in detection points of a detection surface disposed in the respective image space that represents a planar cross section through the respective focused light distribution, and an evaluation unit which brings the detection points of the two detection surfaces into mutual pairwise correspondence and, by analyzing the two lights spots taking into account this image point correspondence, ascertains a lateral x-y position of the point-like object within an object plane residing in the object space and an axial z-position of the point-like object in the direction of an optical axis disposed perpendicularly to the object plane.

In an embodiment, the present invention provides a microscopic device in which each of the two imaging optics includes an optical means that orients the respective focused light distribution obliquely to a detection axis provided in the respective imaging optics that is perpendicular to the detection surface of the respective detector unit; in that the obliquities of the two focused light distributions produced by the optical means are mutually opposite in such a way that, taking into account the image point correspondence, the two light spots shift in opposite directions in response to a change in the z-position of the point-like object in the respective detection surfaces thereof; and in that the evaluation unit ascertains the axial z-position of the point-like object on the basis of the relative position of the two light spots.

In accordance with an embodiment of the present invention, a focused light distribution is understood as a three-dimensional light distribution obtained by imaging an (idealized) point-like object, taking into account the limited resolving power of the imaging optics. In the present technical field, such a focused light distribution is often described in terms of what is generally known as the point spread function, in short PSF.

Thus, the three-dimensional focused light distributions, which are produced by the imaging optics and through which the point-like object, for example, a fluorescing molecule, is imaged onto the two detector units, be angled obliquely relative to the detection axis of the respective detector unit, in order to achieve, so to speak, a break in the symmetry of the focused distributions, which may be very simply and readily utilized to localize the point-like object. Thus, as a result of the obliquity of the respective focused light distributions, an offset of the focused light distribution along the detection axis of the respective detector unit leads to a lateral shift in the light spot produced by the focused light distribution on the corresponding detector unit. Because the obliquities of the two focused light distributions are mutually opposite, the aforementioned lateral shifts in the corresponding lights spots are oppositely directed on the two detector units. Thus (in addition to the lateral x-y position), the axial z-position of the point-like object in the object space may be determined from this oppositely directed lateral shift in the light spots. A simple three-dimensional localization of the object is thereby rendered possible.

To be able to infer the three-dimensional position of the point-like object from the above described, oppositely directed shift in the two light spots on the detector units, a pairwise spatial association of the detection points of the one detection surface with the detection points of the other detection surface is provided. This association provides a unique correspondence of the detection points of the two detection surfaces that makes it possible to mutually compare the positions of the two light spots to determine the three-dimensional position of the point-like object. Therefore, the detection point correspondence in accordance with the present invention may also be understood as a superimposition of the images that makes the localization possible.

The device according to an embodiment of the present invention makes it possible to simply evaluate the light spots produced on the detector units without the need for a complicated image analysis or pattern recognition. It allows a rapid, ideally real-time capable, three-dimensional object localization without requiring technically complex or cost-intensive special optics.

The device may be used in the high-resolution localization microscopy explained at the outset where, until now, merely a two-dimensional localization has been generally possible. However, it is not limited to such a use. Thus, the device may also be used, for example, in a method referred to as "particle tracking" that is used, for example, for tracking moving diffusing particles as a function of time. Any use is conceivable where the aim is to provide a three-dimensional positional determination of defined point-like objects. Mention is also made here exemplarily of single-molecule microscopy. In the present context, point-like objects are to be understood as all objects whose spatial extent is smaller than the conventional (diffraction-limited) resolution of the imaging optics.

The evaluation unit preferably acquires a centroid position of the respective light spot and determines the lateral x-y position, as well as the axial z-position on the basis of the acquired centroid positions of the two light spots. The centroid positions may be acquired in the manner generally known from localization microscopy. The precision with which the centroid position is determined essentially depends on the signal-to-noise ratio at which the light spots are captured by the detector units, thus, for example, on the number of detected photons of a fluorescing molecule forming the point-like object. The localization precision may be enhanced through the use of a suitable image processing to differentiate and/or eliminate background or noise signals. In any case, the process of determining the respective centroid position is based on the knowledge that the particular light spot is produced by one single point-like object. This makes it possible to determine the position of the object with a spatial precision far better than the resolution limit of the imaging optics.

In one advantageous embodiment, the evaluation unit determines the lateral x-y position of the point-like object on the basis of the mean of the centroid positions of the two light spots. This makes it possible to determine the lateral position of the object in the object space with exceptional precision.

The evaluation unit preferably ascertains the axial z-position of the point-like object on the basis of the distance between the centroid positions of the two light spots. If the detection surfaces of the two detector units are optically mutually conjugate, i.e., image the same object plane, then—taking into account the detection point correspondence described further above—the distance between the centroid positions of the two light distributions is essentially equal to zero, given an exact focusing on the object plane. If the detection point correspondence is understood as a superimposition of images, then the centroid positions coincide in this case. On the other hand, with increased defocusing, the distance increases in terms of absolute value due to the opposite obliquity of the two focused light distributions; the opposite obliquity of the distributions also making it possible to clearly discern the direction in which this defocusing is taking place, i.e., whether the two detection surfaces reside in front of or behind a plane disposed in the image space that is optically conjugate to the object plane containing the object to be localized. This allows a unique and precise determination of the axial z-position of the object.

The detection surfaces of the two detector units are preferably optically conjugate to the same object plane in the object space. This makes possible an especially simple evaluation of the two light spots, whose positions in the respective detection surfaces are a function of the focusing state of the detection surfaces relative to the object plane containing the object to be localized.

In one preferred specific embodiment, the device features a recording lens that is shared by both imaging optics and that converts the light emerging from the point-like object into a preferably parallel bundle of rays, and features a beamsplitter that splits the bundle of rays generated by the recording lens into two partial bundles of rays which each produce one of the two light spots on the respective detector unit. The beamsplitter may be configured, for example, to direct the light emanating from the point-like object by one half to the one and, by the other half, to the other detector unit. In this specific embodiment, the shared recording lens may be regarded as part of the one, as well as as part of the other imaging optics. If the recording lens converts the light emerging from the object into a parallel bundle of rays, then the imaging optics downstream of the recording lens may be positioned very flexibly in the beam paths assigned thereto.

Each of the imaging optics preferably features a tube lens that focuses the respective partial bundle of rays onto the respective detector unit. In this case, the tube lens may be used in the respective imaging optics to obliquely angle the light distribution in accordance with the method of the present invention. This may be accomplished, for example, in that the tube lens is transversely offset from the optical axis of the imaging optics, so that the partial bundle of rays generating the focused light distribution strikes the tube lens off-center. In the case of such off-center incidence, the tube lens produces the desired obliquity of the focused light distribution. If the transverse offset of the tube lens relative to the optical axis of the imaging beam path is variably settable, then the obliquity of the focused light distribution may be changed as desired. It is advantageous in this case that the corresponding detector unit likewise be spatially adjustable to enable it to be controlled in dependence upon the change in position of the focused light distribution.

For example, the optical means for obliquely angling the respective focused light distribution provides for an off-center illumination, preferably an off-center under-illumination of an optical element provided in the respective imaging optics. Thus, the off-center illumination explained above with regard to a tube lens may also be provided for any other desired optical element of the respective imaging optics in order to achieve the desired obliquity of the focused light distribution. Under-illumination is understood here as a light incidence where the entrance pupil of the optical element is not traversed completely, rather only partially by the light. The dimensions of the focused light distribution are able to be increased by such an under-illumination. A variable under-illumination is especially preferred, as it permits adjustment of the size of the focused light distribution within a broad range.

The desired opposite obliquity of the focused light distributions may also be realized in any other desired manner. Besides lenses or lens groups that are transversely offset from the optical axis of the respective beam path, lenses may also be used, for example, that have an aspherical lens surface which produces the desired obliquity of the focused light distribution. The optical means according to the present invention may also be a spatial light modulator which influences the wavefront of the incident light so as to achieve the desired obliquity of the focused light distribution.

The two detector units are not necessarily separately implemented components. They may also be jointly configured on one module, for example, in the form of two sub-areas of a CCD camera module. This eliminates the need for adjusting the two detector units to mutually position them in the desired manner.

Another aspect of the present invention provides for a microscopic method for the three-dimensional localization of point-like objects.

The method according to embodiments of the present invention may be used very beneficially in the localization microscopy described at the outset. In this case, a plurality of point-like objects are simultaneously imaged onto the respective detector unit for three-dimensional localization; in the object space, the point-like objects being spaced apart by lateral distances that are large enough to allow the light spots imaging the point-like objects in the respective detection surface to be captured spatially separately from one another. Thus, a multitude of point-like markers may be three-dimensionally localized by recording one single raw data image. Complicated three-dimensional structures may also be simply and rapidly reconstructed by subsequently bringing together the ascertained centroid positions for a sequence of individual images in an assembled image.

Figure 2:
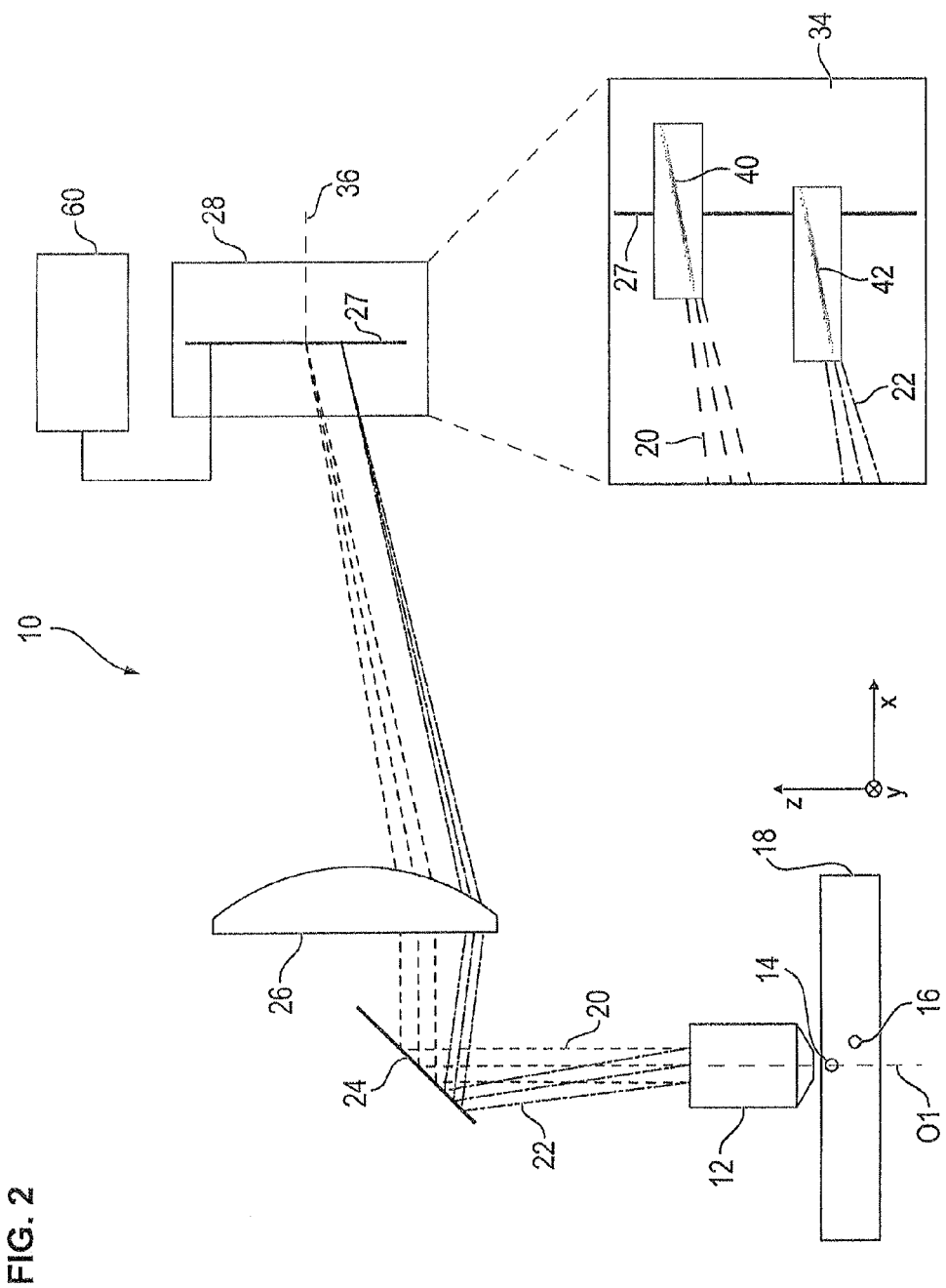
FIG. 2 shows a representation of a light microscope corresponding to FIG. 1 for illustrating the imaging in accordance with the present invention of point-like objects onto a detector unit.
Figure 3:
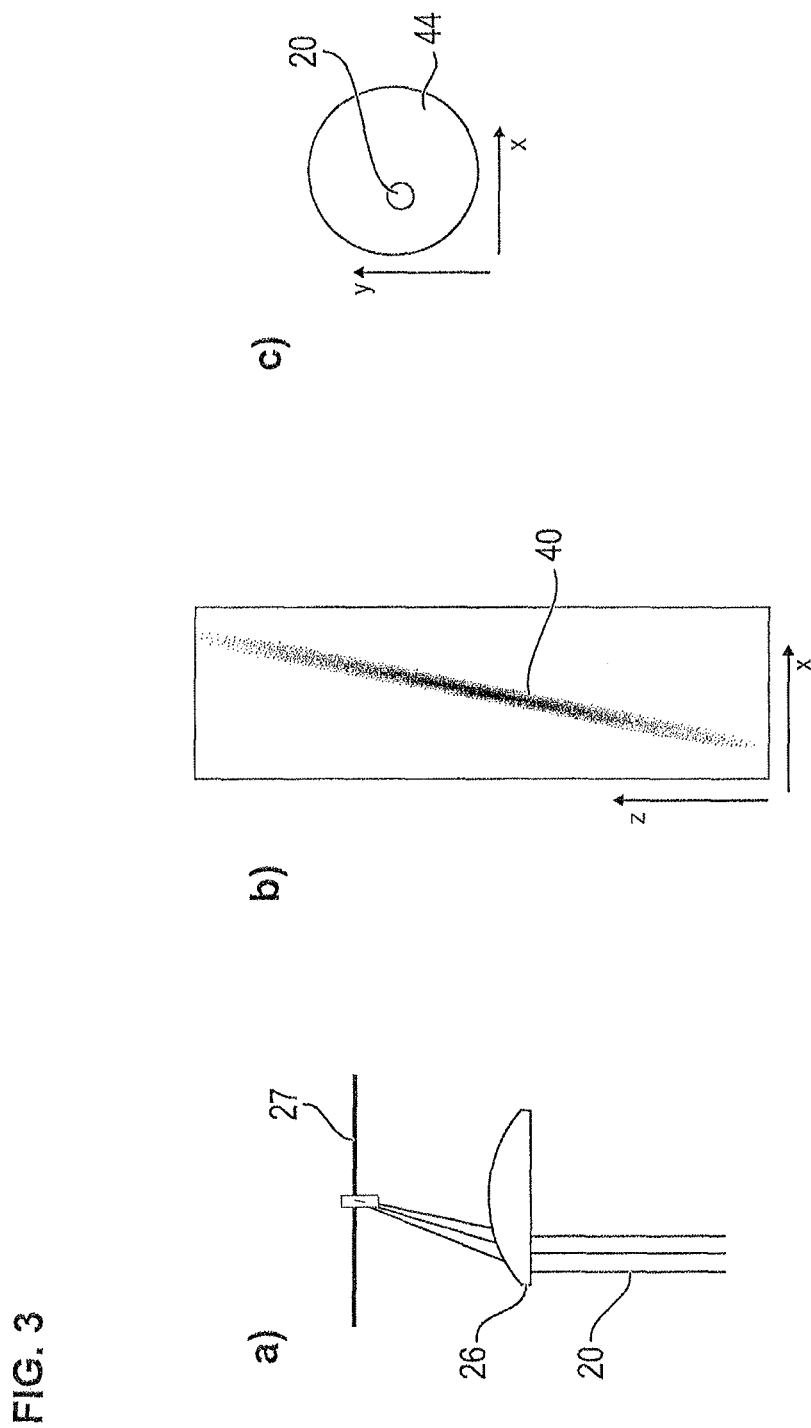
FIG. 3 shows a schematic representation of a detector-side beam path of the light microscope in accordance with FIG. 2, this representation illustrating the generation of an obliquely angled focused light distribution.
Figure 4:
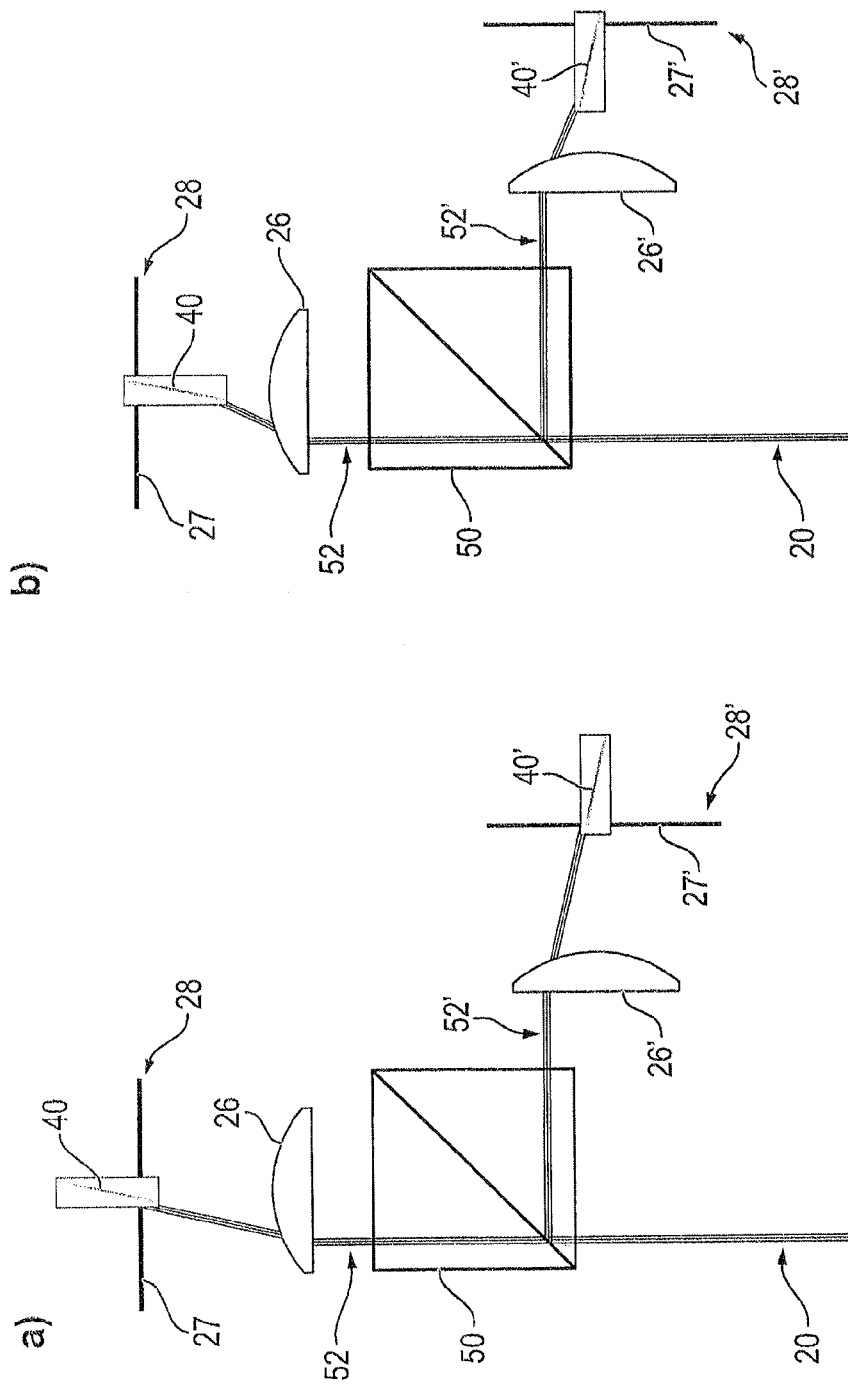
FIG. 4 shows a schematic representation illustrating the use according to an embodiment of the present invention of two detector units for different focusing states.

A wide-field microscope 10, capable of carrying out a three-dimensional localization of point-like objects in accordance with an embodiment of the present invention, is illustrated in FIGS. 2 through 4. Only those microscope components are shown in each of FIG. 2 through 4 which are essential to the understanding of the relevant subject matter to be clarified.

To clarify the localization principle according to the present invention, light microscope 10 shown in FIG. 2 shall first be compared to a microscope shown in FIG. 1 that, to a large degree, is identical in design to the light microscope according to FIG. 2, but does not function in accordance with the method of the present invention. In FIGS. 1 and 2, equivalent or mutually corresponding microscope components are denoted by the same reference numerals.

The wide-field light microscope 10 in accordance with FIG. 1 includes a recording lens 12 that receives the light emanating from two point-like objects 14 and 16. Point-like objects 14 and 16 are fluorescing molecules, for example, that are present in a sample 18.

The following will explain how point-like objects 14 and 16 are localized within sample 18. This localization is to take place with reference to a coordinate system indicated in FIG. 1 by axes x, y, z. It is intended, in particular, that a lateral x-y position be determined for point-like objects 14 and 16 within an object plane that resides in an object space formed by sample 18 and is disposed parallel to the x-y plane with reference to the coordinate system shown in FIG. 1. In addition, an axial z-position of respective object 14, 16 is to be ascertained in the direction of an optical axis O1 that is perpendicular to the aforementioned object plane.

The light emerging from point-like object 14 is converted by recording lens 12 into a bundle of rays 20. Accordingly, recording lens 12 forms a parallel bundle of rays 22 from the light emanating from point-like object 16. In the example illustrated in FIG. 1, it is assumed that point-like object 14 resides on optical axis O1, so that bundle of rays 20 associated with object 14 propagates parallel to optical axis O1. On the other hand, it is assumed that point-like object 16 is laterally offset from optical axis O1, so that bundle of rays 22 associated with object 16 propagates obliquely relative to optical axis O1.

The two bundles of rays 20 and 22 are reflected by a mirror 24 onto a tube lens 26. Tube lens 26 allows both bundles of rays 22 and 24 to converge onto a detection surface 27 of a detector unit 28. The two point-like objects 14 and 16 are imaged in this manner via the imaging optics composed of lens 12 and tube lens 26 onto detection surface 27 of detector unit 28.

Detection surface 27, as well as bundles of rays 20 and 22 converging in the direction of detection surface 27 are shown again in FIG. 1 in an enlarged view to show clearly that point-like objects 14 and 16 are imaged in accordance with the spatial position thereof within sample 18 into different regions 30 and 32 of a three-dimensional image space 34. Thus, within detection surface 27 of detector unit 28, images of point-like objects 14 and 16 are formed which, depending on the spatial position thereof in the z-direction, are axially focused to a lesser or greater degree onto detection surface 27. To simplify the explanation, reference is made here and also in the following, on the detector side as well, to the coordinate system including axes x, y, z thereof associated with sample 18.

From the unsharpness of bundles of rays 20 and 22 in detection surface 27, it is possible to deduce whether point-like objects 14 and 16 reside within or outside of an object plane to which detection surface 27 is optically conjugate. Since, in the case of the optical imaging illustrated in FIG. 1, bundles of rays 20 and 22 nevertheless impinge perpendicularly onto detection surface 27, i.e., in the direction of a detection axis 36 disposed perpendicularly to detection surface 27, it is not possible to conclude whether point-like objects 14 and 16 reside in the z-direction in front of or behind the plane that is conjugate to the object. As may be appreciated from the representation according to FIG. 1, the defocusing of bundles of rays 20 and 22 behaves, namely, symmetrically with respect to a shift in front of or behind detection surface 27.

From the above explanations, it results that, in the case of the imaging illustrated in FIG. 1, a lateral positional determination is, in fact, possible in an object plane parallel to the x-y plane, however, no positional determination is possible in the z-direction since the focused light distributions produced by bundles of rays 20 and 22 are symmetrical in the z-direction. For a three-dimensional positional determination, which includes a determination in the z-direction, a break in the symmetry of the focused light distributions is required, so to speak, that is clarified in the following with reference to the exemplary embodiment according to FIG. 2.

Inventive light microscope 10 according to FIG. 2 features the same components as the microscope illustrated in FIG. 1. It is noted here, however, that light microscope 10 not only includes detector unit 28 shown in FIG. 2, but also another detector unit that is essentially identical in design, as is derived, for example, from FIG. 4 clarified further below. Therefore, the representation according to FIG. 2 is simplified in order to contrast the differences from the conventional configuration according to FIG. 1.

An important feature of the approach illustrated in FIG. 2 resides in that bundles of rays 20 and 22 emanating from point-like objects 14 and 16 generate focused light distributions 40, respectively 42 in image space 34 that are obliquely angled relative to detection axis 36 of detector unit 28. As is inferable from the representation according to FIG. 2, focused light distributions 40 and 42 show a path relative to detection axis 36 that may also be characterized as diagonal. This diagonal shape of focused light distributions 40 and 42 is achieved in the exemplary embodiment according to FIG. 2 in that tube lens 26 is transversely offset from optical axis O1 that is deflected by mirror 24 toward tube lens 26. As a result of this transverse offset of tube lens 26, tube lens 26 is traversed off-center by bundles of rays 20, 22.

In comparison to the illustration shown in FIG. 1, this may be best recognized by bundle of rays 20, which emanates from object 14 situated on optical axis O1 and propagates parallel to optical axis O1. In the configuration shown in FIG. 1, bundle of rays 20 is disposed axially symmetrically to the optical axis of tube lens 26. In the approach according to FIG. 2, the axial symmetry of beam 20 relative to tube lens 26 is broken. This factual situation is illustrated again in the representation according to FIG. 3. FIG. 3 under a) shows how bundle of rays 20 is focused through tube lens 26 onto detection surface 27, while, under b), it shows focused light distribution 40 emerging from bundle of rays 20 in the x-z plane, and, under c), shows the off-center under-illumination of an entrance pupil 44 of tube lens 26 in the x-y plane.

As is inferable from FIG. 3 under c), entrance pupil 44 of tube lens 26 is not fully illuminated by beam 20. Rather an under-illumination is provided in such a way that bundle of rays 20 only passes through a partial region of entrance pupil 44 that is offset in the x-direction from the middle of entrance pupil 44. The result is the shape of focused light distribution 40 extending diagonally in the x-z plane in image space 34, as shown under b).

As explained further above, the two bundles of rays 20 and 22 propagating between recording lens 12 and tube lens 26 form parallel light beams. However, in this area of the imaging beam path, bundles of rays 20, 22 are not necessarily parallel light beams. For example, it is equally conceivable to configure the optical imaging in such a way that the pupil plane of tube lens 26 is a conjugate plane of the pupil plane of recording lens 12.

Thus, in the configuration shown in FIG. 2, tube lens 26 is under-illuminated asymmetrically in the manner described above. For this, it is transversely offset from optical axis O1. However, to realize the asymmetrical under-illumination of tube lens 26, guidance of beams 20 and 22 itself may likewise be offset. For this, special beam guidance components, such as a tilting mirror, for example, may be inserted into the beam path.

The asymmetrical under-illumination of tube lens 26 illustrated in FIGS. 2 and 3 is also to be understood as merely exemplary. However, other measures are also conceivable which produce the diagonal shapes of focused light distributions 40 and 42 illustrated in FIGS. 2 and 3. Reference is made exemplarily to the use of aspherical lenses or to the use of spatial light modulators which are likewise able to generate the desired focused light distributions.

As already mentioned further above, light microscope 10 according to the present invention not only features detector unit 28 shown in FIG. 2, but also another detector unit denoted in FIG. 4 by 28'. Accordingly, a further tube lens 26' is provided that is assigned to detector unit 28'. Thus, together with recording lens 12, tube lens 26 forms a first imaging optics. Accordingly, a second imaging optics is provided by recording lens 12 and tube lens 26'.

FIG. 4 shows exemplarily bundle of rays 20 that is split by a beamsplitter 50 into a partial bundle of rays 52 and a second partial bundle of rays 52'. First bundle of rays 52 passes through tube lens 26 and then produces focused light distribution 40, 40'. Accordingly, second bundle of rays 52' passes through tube lens 26' and generates focused light distribution 40'.

Two different focusing states are shown in FIG. 4 under a) and b). Thus, under a), one discerns that focused light distributions 40 and 40' are configured for the most part downstream of respective detection surface 27, respectively 27'. On the other hand, in the focusing state shown under b), they are configured for the most part upstream of respective detection surface 27, respectively 27'.

Figure 5:
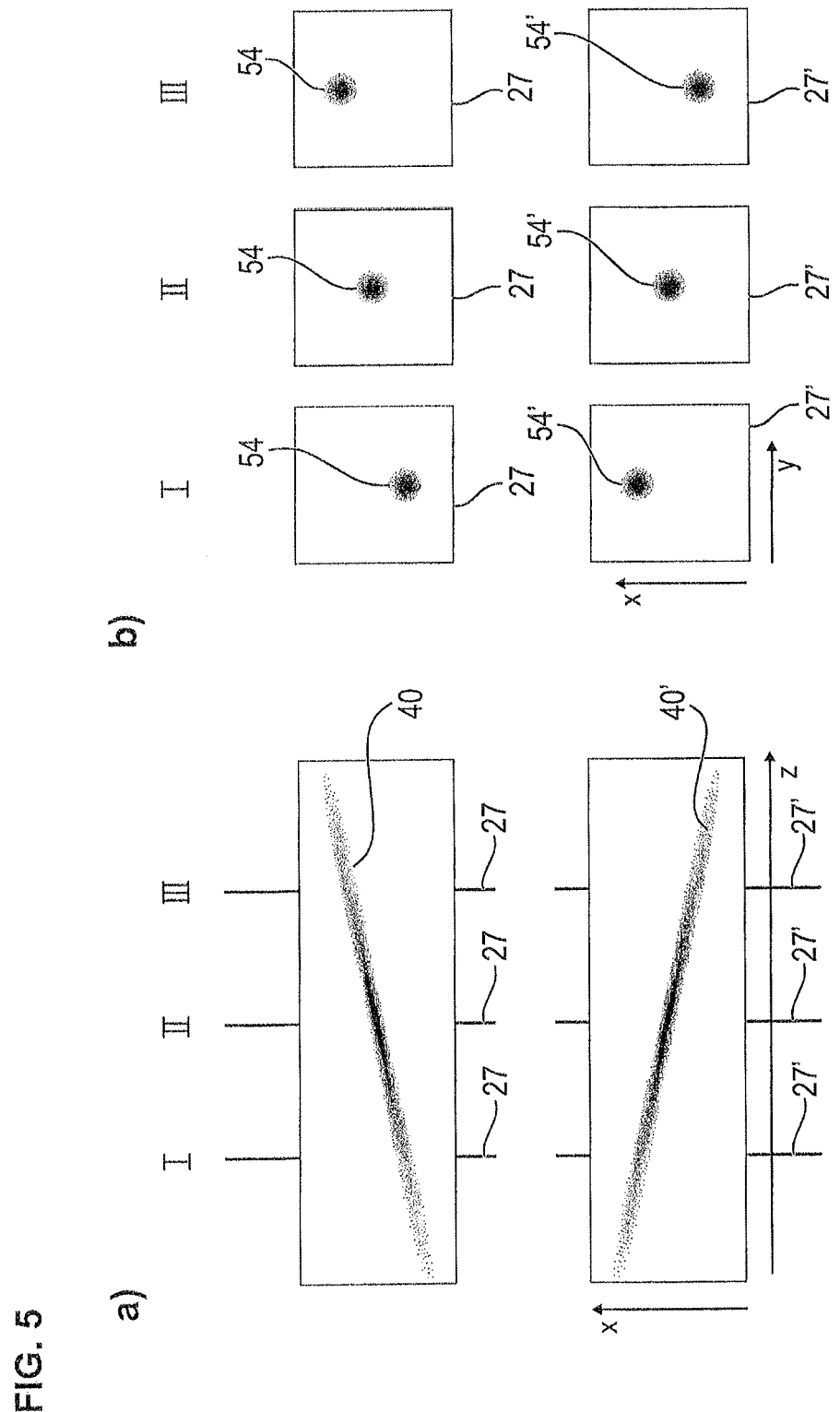
FIG. 5 shows a schematic representation illustrating the two focused light distributions and the light spots produced by the same on both detector units for different focusing states.

FIG. 5 under a) shows that the two focused light distributions 40 and 40' are obliquely positioned in the present exemplary embodiment in a sectional view parallel to the x-z plane. Three different focusing states are shown that are denoted in FIG. 5 by I, II and III, and that are distinguished in each case by a predetermined spatial position of detection surface 27, respectively 27' relative to corresponding focused light distribution 40, respectively 40'. FIG. 5 under b) shows light spots 54, respectively 54' which generate focused light distributions 40, 40' for the three focusing states I, II and III illustrated under a), in each case in corresponding detection surface 27, respectively 27'. Light spots 54 and 54' each form a two-dimensional light distribution that represents a planar cross section through respective focused three-dimensional light distribution 40, 40' parallel to the x-y plane.

To determine lateral x-y position, as well as the axial z-position of point-like object 14 on the basis of light spots 54 and 54' produced in detection surfaces 27 and 27', the detection points of both detection surfaces 27 and 27' (for example, the individual image elements of a CCD image sensor), in which light spots 54 and 54' are recorded, are set into mutual pairwise correspondence. A detection point of detection surface 27' is thereby uniquely assigned to each detection point of detection surface 27. Such a detection point correspondence corresponds essentially to a superimposition of the object images produced on detection surfaces 27 and 27'.

The three focusing states I, II and III illustrated under a) of FIG. 5 reflect the characteristics of three different z-positions of point-like object 14 within sample 12. In the example shown in FIG. 5, focused light distributions 40 and 40' in focusing state 1 reside for the most part behind corresponding detection surface 27, respectively 27'. Accordingly, light spots 54 and 54' are displaced downwards, respectively upwards in the x-direction in corresponding detection surface 27, respectively 27'. On the other hand, in focusing state II, focused light distributions 40 and 40', together with their respective centroids, are located directly in corresponding detection surface 27, respectively 27'. Accordingly, light spots 54 and 54' are centrally located in detection surface 27, respectively 27'. Finally, focused light distributions 40 and 40' in focusing state III largely reside in front of detection surface 27, respectively 27'. Accordingly, light spot 54 is displaced upwards in detection surface 27, and light spot 54' is displaced downwards in detection surface 27'.

In the present example, the inverse relationship of focused light distributions 40 and 40' induces oppositely directed shifts of light spots 54 and 54' along the x-axis in detection surfaces 27, respectively 27' assigned thereto. For example, if light spot 54 is shifted along the x-axis in the negative direction in detection surface 27 (downwards in FIG. 5), as is the case in focusing state I, then light spot 54' is displaced along the x-axis in the positive direction in detection surface 27' (upwards in FIG. 5). Exactly the reverse is true in focusing state III, while in focusing state II, which is intended to illustrate the optimal sharp imaging of point-like object 14 onto detection surfaces 27 and 27' in the context of the resolution limit of the imaging optics, each of the two light spots 54 and 54' are located in the center of respective detection surface 27, respectively 27'.

To localize point-like object 14 in three dimensions, the centroid positions of both light spots 54 and 54' are first ascertained. To determine the lateral x-y position of object 14, the mean of the centroid positions of light spots 54 and 54' is then determined. As is inferable from the example according to FIG. 5, the mean of the centroid positions of both light spots 54 and 54' is the same for all three focusing states I through III. Thus, this mean corresponds exactly to the center of the respective detection surface 27, respectively 27' (in optimal focusing state II, the center already coinciding with the centroid positions of both light spots 54 and 54'). Therefore, it is not only possible to correctly determine the lateral x-y position in optimal focusing state II, but also in both other focusing states I and III in which detection surfaces 27 and 27' are not exactly optically conjugate to the object plane in which the object to be localized is situated.

The axial z-position is then determined on the basis of the distance of the two light spots 54 and 54' from the previously ascertained, shared center point thereof. This means that the z-position of the object to be localized is ascertained on the basis of the relative position, in particular of the relative mutual distance of the two light spots 54 and 54'. As is inferable from the representation according to FIG. 5, this relative mutual distance for the three illustrated focusing states I, II and III results in different values, that reflect the various z-positions of the object to be localized underlying these focusing states. For the example shown in FIG. 5, the relative distance between the two light spots 54 and 54' in optical focusing state II ideally yields the value 0, while for the two other focusing states I and III, it yields the values which could more or less be the same in terms of absolute value, but could differ from one another by the operational sign thereof. In any case, a unique determination of the z-position of the object is possible.

It should also be noted that light microscope 10 shown in FIG. 2 features an evaluation unit 60 for evaluating light spots 54 and 54' clarified above. This evaluation unit 60 executes all operations provided for the localization of the point-like objects. Thus, for example, it undertakes the image superimposition described above for producing the detection point correspondence, the determination of the centroid positions and, finally, the calculation of the lateral x-y position, as well as of the axial z-position.

It is self-evident that not only one single object, but also a multitude of objects are localized at the same time in the manner described above. It should merely be noted in this connection that the light spots produced on detection surfaces 27 and 27', which each originate from one single point-like object, are spatially separable from one another.

While the invention has been particularly shown and described with reference to preferred embodiments thereof, it will be understood by those skilled in the art that various changes in form and details may be made therein without departing from the spirit and scope of the invention.

LIST OF REFERENCE NUMERALS 10 light microscope
12 recording lens
14, 16 point-like objects
18 sample
20, 22 bundle of rays
26, 26' tube lens
27, 27' detection surface
28, 28' detector unit
30, 32 regions of an image frame
34 image space
36 detection axis
40, 40', 42, 42' focused light distributions
44 entrance pupil
50 beamsplitter
52, 52' partial bundle of rays
54, 54' light spot
O1 optical axis

What is claimed is:

1. A microscopic device for three-dimensional localization of point-like objects, the microscopic device comprising:
   two imaging optics, each configured to image a same point-like object in a single object plane located in an object space into a respective separate image space in a form of a focused light distribution;
   two detector units, each associated with a respective one of the imaging optics and configured to capture an analyzable light spot in a detection point of a detection surface disposed in the respective image space that represents a planar cross section through the respective focused light distribution, each of the imaging optics including an optical device configured to orient the respective focused light distribution obliquely to a detection axis that is provided in the respective imaging optics and that is disposed perpendicularly to the detection surface of the respective detector unit, the obliquities of the two focused light distributions being opposite to each other in such a way that, taking into account the detection point correspondence, the two light spots shift in opposite directions in response to a change in the z-position of the point-like object in the respective detection surface; and
   an evaluation unit configured to bring the detection points of the two detection surfaces into pairwise correspondence and to analyze the two light spots in view of the image point correspondences so as to ascertain a lateral x-y position of the point-like object within the object plane residing in the object space and an axial z-position of the point-like object in a direction of an optical axis disposed perpendicularly to the object plane, the evaluation unit ascertaining the axial z-position of the point-like object based on the relative position of the two light spots.

2. The microscopic device as recited in claim 1, wherein the evaluation unit is configured to acquire a centroid position of each respective light spot and determine the lateral x-y position, as well as the axial z-position on the basis of the acquired centroid positions of the two light spots.

3. The microscopic device as recited in claim 2, wherein the evaluation unit is configured to ascertain the lateral x-y position of the point-like object based on of a mean of the centroid positions of the two light spots.

4. The microscopic device as recited in claim 2, wherein the evaluation unit is configured to ascertain the axial z-position of the point-like object based on of a distance between the centroid positions of the two light spots.

5. The microscopic device as recited in claim 1, wherein the detection surfaces of each of the imaging optics is optically conjugate to the object plane in the object space.

6. The microscopic device as recited in claim 1, further comprising:
   a recording lens that is shared by both imaging optics and that is configured to convert light emerging from the point-like object into a bundle of rays, and
   a beam splitter configured to split the bundle of rays generated by the recording lens into two partial bundles of rays which each produce one of the two light spots on the respective detection surface.

7. The microscopic device as recited in claim 6, wherein the rays of the bundle are parallel.

8. The microscopic device as recited in claim 6, wherein each of the imaging optics includes a tube lens configured to focus the respective partial bundle of rays onto the respective detection surface.

9. The microscopic device as recited in claim 1, wherein the optical device for obliquely angling the respective focused light distribution provides an off-center illumination of an optical element provided in the respective imaging optics.

10. The microscopic device as recited in claim 9, wherein the off-center illumination is an off-center under-illumination.

11. The microscopic device as recited in claim 1, wherein the optical device is a lens having an aspherical lens surface.

12. The microscopic device as recited in claim 1, wherein the optical device is a spatial light modulator.

13. The microscopic device as recited in claim 1, wherein the two detector units are jointly configured on one module.

14. A microscopic method for three-dimensional localization of point-like objects, the method comprising:
   imaging a same point-like object in a single object plane located in an object space in a form of focused light distribution into two separate image spaces;
   capturing, for each of the image spaces, an analyzable light spot in a respective detection point of a respective detection surface disposed in a respective one of the image spaces that represents a planar cross section through a respective one of the focused light distributions, each of the respective focused light distributions being oriented obliquely to a detection axis that is disposed perpendicularly to the respective detection surface;
   bringing the detection points of the respective two detection surfaces into pairwise correspondence, the obliquities of the two focused light distributions being opposite to each other in such a way that, taking into account the detection point correspondence, the two light spots shift in opposite directions in response to a change in the z-position of the point-like object in the respective detection surfaces; and
   analyzing the two light spots, taking into account the detection point correspondence, so as to ascertain a lateral x-y position of the point-like object within the object plane residing in the object space and an axial z-position of the point-like object in a direction of an optical axis disposed perpendicularly to the object plane, the axial z-position of the point-like object being ascertained based on a relative position of the two light spots.

15. The microscopic method as recited in claim 14, wherein a plurality of point-like objects are simultaneously imaged onto each of the respective detection surfaces for three-dimensional localization, the point-like objects being spaced apart in the object space by lateral distances that are large enough to allow the light spots imaging the point-like objects in the respective detection surface to be captured spatially separately from one another.

16. The microscopic method as recited in claim 15, wherein the point-like objects are objects that are switchable between a bright and a dark state.

17. The microscopic method as recited in claim 16, wherein the objects are fluorescing molecules.

* * * * *